United States Patent [19]

Jackovitz et al.

[11] 4,243,638
[45] Jan. 6, 1981

[54] IRON EDTA CHELATE CATALYZED OXIDATION OF URANIUM

[75] Inventors: John F. Jackovitz, Monroeville; Armand J. Panson, Pittsburgh; Earl A. Pantier, Verona, all of Pa.

[73] Assignee: Westinghouse Electric Corp., Pittsburgh, Pa.

[21] Appl. No.: 915,648

[22] Filed: Jun. 15, 1978

[51] Int. Cl.$^2$ .................. C06G 43/00; E21B 43/28
[52] U.S. Cl. .............................. 423/17; 299/5; 423/15
[58] Field of Search ............... 299/4, 5; 423/17, 15

[56] References Cited

U.S. PATENT DOCUMENTS

| | | | |
|---|---|---|---|
| 3,309,140 | 3/1967 | Gardner et al. | 299/5 |
| 3,700,280 | 10/1972 | Papadopoulos et al. | 299/5 |
| 3,708,206 | 1/1973 | Hard et al. | 299/5 |
| 3,792,903 | 2/1974 | Rhoades | 423/17 |
| 4,103,963 | 8/1978 | Espenscheid et al. | 299/4 |
| 4,155,982 | 5/1979 | Hunkin et al. | 423/17 |

*Primary Examiner*—Edward A. Miller
*Attorney, Agent, or Firm*—R. D. Fuerle

[57] ABSTRACT

Uranium ore deposits which contain uranium in the relatively insoluble tetravalent state are readily selectively leached in situ to recover relatively pure uranium compounds, by: (a) passing through the ore deposit a relatively dilute aqueous leach solution of ammonium bicarbonate, ferric ammonium ethylenediaminetetraacetic acid (EDTA), and a source of oxygen, the leach solution converting the tetravalent uranium to hexavalent uranium which readily dissolves in the leach solution; (b) withdrawing the reacted leach solution enriched in dissolved uranium from the ore deposit; and (c) stripping the uranium from the withdrawn leach solution. The stripping of the uranium from the leach solution is preferably accomplished by countercurrent flow of the enriched leach solution to a column of base anion exchange material which preferentially extracts the uranium. Base anion exchange material loaded with uranium is separated from the leach solution and is treated with an aqueous alkaline eluant to extract the uranium and to regenerate the base anion exchange material. The stripped leach solution is adjusted by adding ammonium bicarbonate, peroxide, and ferric ammonium EDTA, and its pH corrected if necessary, and the leach solution is recycled through the ore deposit. The uranium bearing eluant is then acidified and treated with ammonia to precipitate relatively pure ammonium diuranate (ADU).

12 Claims, 7 Drawing Figures

IRON EDTA CHELATE CATALYZED OXIDATION OF URANIUM

CROSS-REFERENCE TO RELATED APPLICATION

This invention is related to and is an improvement upon the invention set forth in copending application Ser. No. 513,445 filed Oct. 9, 1974, now U.S. Pat. No. 4,155,982, entitled "In Situ Leaching And Recovery Of Uranium From Ore Deposits."

BACKGROUND OF THE INVENTION

1. Field of the Invention:

This invention relates to the recovery of uranium from underground ore deposits or bodies by in situ leaching and the subsequent processing of the enriched leaching solution to recover relatively pure uranium compounds therefrom.

2. Description of the Prior Art:

Efforts have been made in the past to recover mineral values from underground ore deposits by introducing various leaching solutions in order to avoid the costs and problems of mining, such as are involved in tunneling, blasting and hauling of ore to the surface and then processing the ore by various means as by grinding, ball milling and flotation, followed by chemical solution or pyrometallurgy to recover the desired minerals therefrom. The application of leaching solutions of various types to underground ore deposits has been attempted with results that have varied widely, and only a few have been particularly successful, as for example, in the recovery of sulfur and salt. One of the problems leading to a lack of success for leaching out other minerals has been the fact that such other mineral whose recovery by in situ leaching is desired is that they often comprise only a small proportion of the total volume of the soluble minerals and insoluble gangue in the underground ore body. Consequently, the leach solutions must penetrate deeply into masses of gangue for a small recovery of the desired mineral values. In addition, the leaching solutions quite often have reacted with or been contaminated by numerous other minerals than the ones particularly desired as well as by clays and salts. This arises because the contaminants have also been only too well dissolved by the leaching solution. Leach solutions so contaminated have necessitated much subsequent refining processing in order to separate effectively the desired mineral from the undesired materials. A third factor is that excessive amounts of expensive leaching materials are necessarily employed because large proportions thereof are either dissipated, as by reaction of leach acids with limestone or calcite, or else substantial volumes of the expensive leaching solutions escape or are trapped and lost in the crevices of the ore deposit and never recovered.

These problems of in situ leaching are particularly critical in the process of recovery of uranium which is present in small percentages in most ore deposits that are reasonably amenable to leaching in situ.

U.S. Pat. No. 2,738,253 issued Mar. 13, 1956, discloses an initial application of an aqueous solution of sodium chlorate to a uranium bearing ore body followed by an acid leaching solution, which latter may or may not have additional sodium chlorate present therein, in order to recover the uranium values. The inventors in this patent indicate the fact that these ore bodies are often associated with ferrous iron along with tetravalent uranium. Tetravalent uranium is relatively insoluble in the leaching solution. By employing the sodium chlorate, the patent teaches that oxidation of the ferrous iron to ferric iron and the tetravalent uranium to hexavalent uranium is accomplished so that the acid leaching solution will readily dissolve the uranium and render it available.

Other acid leaching solutions are known, as in U.S. Pat. No. 3,309,141 issued Mar. 14, 1967, which discloses the combination of sulfuric acid and sodium chlorate in a leaching solution for extracting uranium from uranium bearing ore. U.S. Pat. No. 3,309,140 issued Mar. 14, 1967 teaches the use of a leaching solution comprising from 5 to 25 grams per liter of nitric acid and from 0.5 to 2 grams per liter of sodium chlorate. It is taught that the sodium chlorate is employed in order to oxidize the tetravalent uranium to the more soluble hexavalent uranium ion. Chlorates and nitric acid are both relatively expensive and have other drawbacks due to their highly corrosive effects on metal valves, piping, etc.

A number of patents have disclosed the employment of sodium carbonate solutions for extracting uranium from underground deposits by a leaching operation. U.S. Pat. No. 2,964,380, issued Dec. 13, 1960 discloses the general concept of a leachant comprising a 3% sodium carbonate solution in water which when applied to crushed uranium ore will leach the uranium therefrom.

U.S. Pat. No. 2,896,930, issued July 28, 1959 states generally that an aqueous solution containing "less than 50 grams per liter of dissolved carbonates" is suitable for underground leaching of uranium ore. An "alkali metal carbonate" is mentioned as suitable for such leaching utility. This patent states generally that "It is advantageous to incorporate an oxidizing agent such as hydrogen peroxide in the leach solution." No specific data or any specific proportions of suitable compositions are given in this patent, other than the above quoted upper limit for unspecified carbonates. At the bottom of column 3, of this patent, it is suggested that the recovery of the uranium whether from the leaching solution or from an inorganic solvent into which it has been incorporated by solvent extraction, may be effected using an ion exchange resin.

Another patent disclosing the use of carbonates is U.S. Pat. No. 2,818,240 issued Dec. 31, 1957. This patent discloses that carbonate solutions comprising 5 to 14% of sodium carbonate, 2% sodium bicarbonate and 5% of sodium chloride form aqueous solutions that would be of a pH of 9.9 to 9.6, but that the sodium chloride reduces the pH to 9.3. This patent also teaches that aqueous solutions of a pH of 9.6 or slightly in excess are effective in leaching out more of the various carbonaceous materials in the ore deposit. The patent also teaches that the sodium bicarbonate depresses the pH, and then it states, "which is undesirable" to secure maximum leading of carbonaceous material as is desired. U.S. Pat. No. 3,708,206, issued Jan. 2, 1973, teaches the pumping of an oxygen bearing gas such as air into a uranium ore body in order to oxidize the uranium to the hexavalent state, and after many hours or days of exposure to the oxidizing gas, a leach solution of sodium carbonate or ammonium carbonate is pumped into the oxidized ore body. The patent teaches as desirable leaching solutions, those containing from 23 to 26 grams per liter of ammonium carbonate.

U.S. Pat. No. 3,792,903 teaches the recovery of uranium from underground ore bodies by introducing leachants comprising sodium carbonate and an oxidant which latter may comprise air, oxygen or hydrogen peroxide. No specific solution compositions are given except that the patent states that the sodium carbonate leaching solution to the oxidizing solution may be proportioned from 1:1 to 1:10 by volume.

U.S. Pat. No. 3,130,960, issued Apr. 28, 1964 teaches the use, as a leaching solution, of carbon dioxide gas impregnated water applied to ore deposits of uranium and vanadium. It is noted that such leaching solutions should comprise at least 20% of the maximum possible carbonation in which 100% equals 30 volumes of carbon dioxide per volume of water. These solutions are obviously acidic. Thirty volumes of carbon dioxide in one volume of water provides approximately 59 grams per liter of carbon dioxide, while 20% carbonation introduces about 12 grams of carbon dioxide per liter. This last patent also teaches that the leach solution, after it has passed through the ore body and brought to the surface, is treated with lime to precipitate the uranium and vanadium values.

From the above, it will be apparent that the leaching solutions have generally been relatively concentrated and have comprised either acids or alkali metal carbonates. U.S. Pat. No. 2,818,240 is the only patent that employs a bicarbonate, namely sodium bicarbonate, in a leaching solution. None of the references teaches the use of ammonium bicarbonate and none suggests employing dilute ammonium bicarbonate solutions, alone, or with a peroxide, for leaching uranium values from ore deposits.

The following articles, comprising papers presented at Geneva, Switzerland from September 1 to September 13, 1958 as part of the "Proceedings of the Second United Nations International Conference on the Peaceful Uses of Atomic Energy," published in Volume 3, "Processing of Raw Materials," are of interest with respect to the present invention:

1. "The Role of Process Development in Western United States Uranium Procurement" by J. W. Barnes—pages 183 to 190;
2. "Some Variations of Uranium-Ore Treatment Procedures" by E. A. Brown et al—pages 195 to 200;
3. "Kinetics of the Dissolution of Uranium Dioxide in Carbonate-Bicarbonate Solutions" by W. E. Schortmann and M. A. DeSesa, pages 333 to 344; and
4. "Extraction of Uranium from Solutions of Sodium Carbonate by Means of Anionic Exchange with Dowex Resin" by M. Urgell et al, pages 444 to 464.

Also note the article by F. A. Foward in the October, 1953 issue of the Canadian Min. and Met. Bulletin, entitled "Studies in the Carbonate Leaching of Uranium Ores."

However, none of this last-mentioned art discloses the use of dilute ammonium bicarbonate and peroxide leaching solutions for recovering the uranium.

SUMMARY OF THE INVENTION

The present invention relates to an improved process and leaching solutions for extracting and recovering uranium from ore deposits in which it resides in its relatively insoluble tetravalent state, by preparing a dilute aqueous alkaline leach solution of from about 0.3 to 5 grams per liter of ammonium bicarbonate, and preferably a mixture of ammonium bicarbonate and ammonium carbonate, a catalyst comprising ferric ammonium EDTA in an amount to provide from about 3 to 100 ppm of iron, with the EDTA:Fe ratio being at least about 1.25:1, and oxygen provided in an amount of from 0.1 to 3 grams per liter of $H_2O_2$, or gaseous oxygen, the pH of the solution being from about 7.4 to 9.5, a small amount of $(NH_4)_4EDTA$ being present to stabilize the ferric ammonium EDTA, for example about 1% to 2% of the weight of the latter, and then passing the solution through the ore deposit where the leach solution first converts the tetravalent uranium it contacts to the hexavalent state and then dissolves the hexavalent uranium. The leach solution dissolves the uranium preferentially to other contaminating metals and elements with which it may be associated in the ore deposit, so that the solution will contain a smaller proportion of such elements as molybdenum, vanadium, copper, arsenic and selenium to the uranium than their ratios in the ore deposit.

The leach solution enriched in uranium after its passage through the ore deposit, is withdrawn from the ground and the uranium is stripped therefrom, preferably by passing it countercurrent to a column or bed of base anion exchange material such for example as a particulate ion exchange resin. The uranium loaded base anion exchange material is separated from the leach solution and is treated with an aqueous eluant to extract the uranium therefrom, and to regenerate the anion exchange material for recycling with more enriched leach solution. The uranium rich aqueous eluant is treated first with an acid and the ammonia to precipitate ammonium diuranate. It has been found that the contaminating metals and elements decrease during the anion exchange material treatment of the leach solution as well as during elution and precipitation of the ADU, so that a relatively pure ADU product is the final result.

The stripped leach solution is then treated by adding more ammonium bicarbonate and $H_2O_2$, as well as the iron chelate catalyst, and recirculated to the ore deposit to recover more uranium.

The ferric ammonium EDTA functions as a catalyst to promote a more rapid conversion of the tetravalent uranium, and further has enabled a more complete recovery of the uranium present in an ore deposit.

The leaching solutions contain no components that are harmful or deleterious to the underground areas or any aquifer associated therewith. All of the components, except the ferric ammonium EDTA, decompose to water, carbon dioxide and oxygen. The ferric ammonium EDTA is present in very dilute concentrations to begin with, and is a widely used component in fertilizers so that it is considered ecologically acceptable. Above ground, the process of this invention results in very low quantities of impurities so that minimal amounts of waste solutions or solids result which require disposal.

After the ore deposit has been leached out to extent it is economically feasible with respect to the uranium present therein, in order to insolubilize any residual uranium and other metals and elements that were affected by the alkaline leach a reducing solution is introduced into the ore deposit, for example an aqueous hydrogen sulfide or ammonium thiosulfate solution is passed therethrough, so as to render the uranium and other metals or elements as insoluble as they were originally. An ecological equilibrium is reestablished with the added advantage that most of the uranium is no longer present in that deposit. The process is ecologically and environmentally highly advantageous because it produces above ground a very low volume of impurities and wastes requiring disposal, while underground it causes no significant or material contamination of the earth or any aquifer associated with the ore deposit.

DESCRIPTION OF THE DRAWINGS

For a better understanding of the nature and practice of the invention, reference should be had to the following detailed description and drawings wherein.

DETAILED DESCRIPTION OF THE INVENTION

The present invention is particularly adapted to recover rapidly and efficiently practically all the uranium in an ore deposit wherein the uranium is present in the highly insoluble tetravalent state and is usually associated with one or more contaminating metals and elements such as molybdenum, vanadium, selenium, arsenic, and copper as well as iron. These contaminating metals and elements are undesirable in uranium for nuclear reactor purposes and it is highly beneficial to reduce their presence to small fractions of one percent, so that purification of the uranium in subsequent treatments prior to enrichment is easier and more economical. The invention is based on the preparation of dilute aqueous alkaline leach solutions which are passed through uranium ore deposits and solubilize the uranium by converting it to the hexavalent state which dissolves readily in the leach solutions in preferential proportions as compared to the contaminating elements and metals in the ore deposit.

Representative of ore deposits that are amenable to the practice of this invention are those designated as roll front deposits that are characterized by a redox interface therein.

Briefly geological studies have established the fact that uranium which has been brought to the surface of the earth by volcanic action or the like will dissolve to some degree in surface waters containing oxidizing agents along with carbonic acid. The streams containing the dissolved uranium, along with other metal values, may flow into fluvial sand deposits or, in some cases porous sandstones, which are quite often overlaid and underlaid by mudstone layers of a low permeability. Such sand or sandstone deposits may comprise quartz or silica sands, feldspars and often include carbonate minerals such as calcite and have varying degrees of porosity and/or permeability. The sand or sandstone deposits may include varying amounts of carbonaceous matter such as wood or plant residues, and iron sulfide. Sometimes oil or hydrocarbon gas deposits underly these sandstone and the oil or gas may slowly percolate therethrough. At or in certain areas, hydrogen sulfide which may be present further underground may diffuse or leak into the sandstone deposits to produce a reducing condition while the calcite and feldspar tend to produce a basic condition in the sandstone. When the flowing waters containing uranium and other dissolved minerals enter such sandstone deposits in which reducing and non-acidic conditions are present, the uranium is reduced to the tetravalent state and immediately precipitates within the interstices of the sand or sandstone formation. Vanadium, molybdenum, and selenium as well as other elements are reduced at the same time and also deposit, either concurrently with the uranium or nearby.

Figure 1:
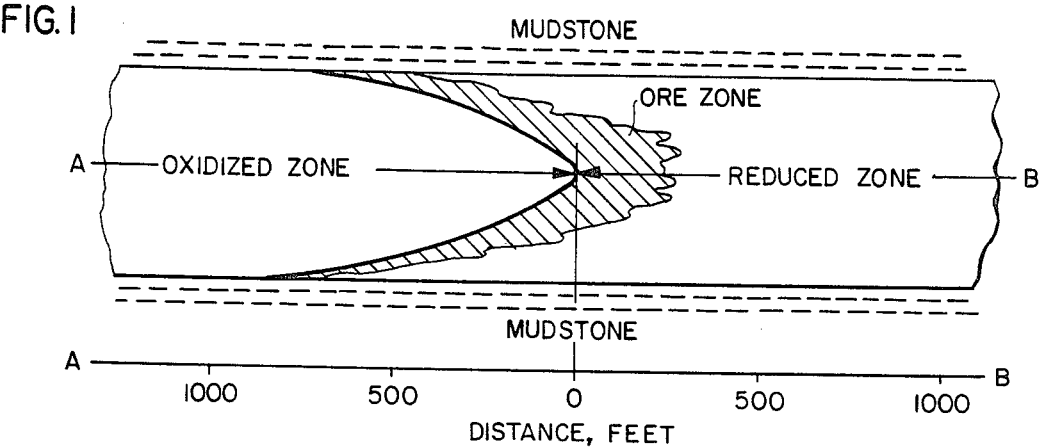
FIG. 1 is a vertical cross-section of a roll-front ore deposit showing schematically typical mineral conformations at a redox interface.
Figure 2:
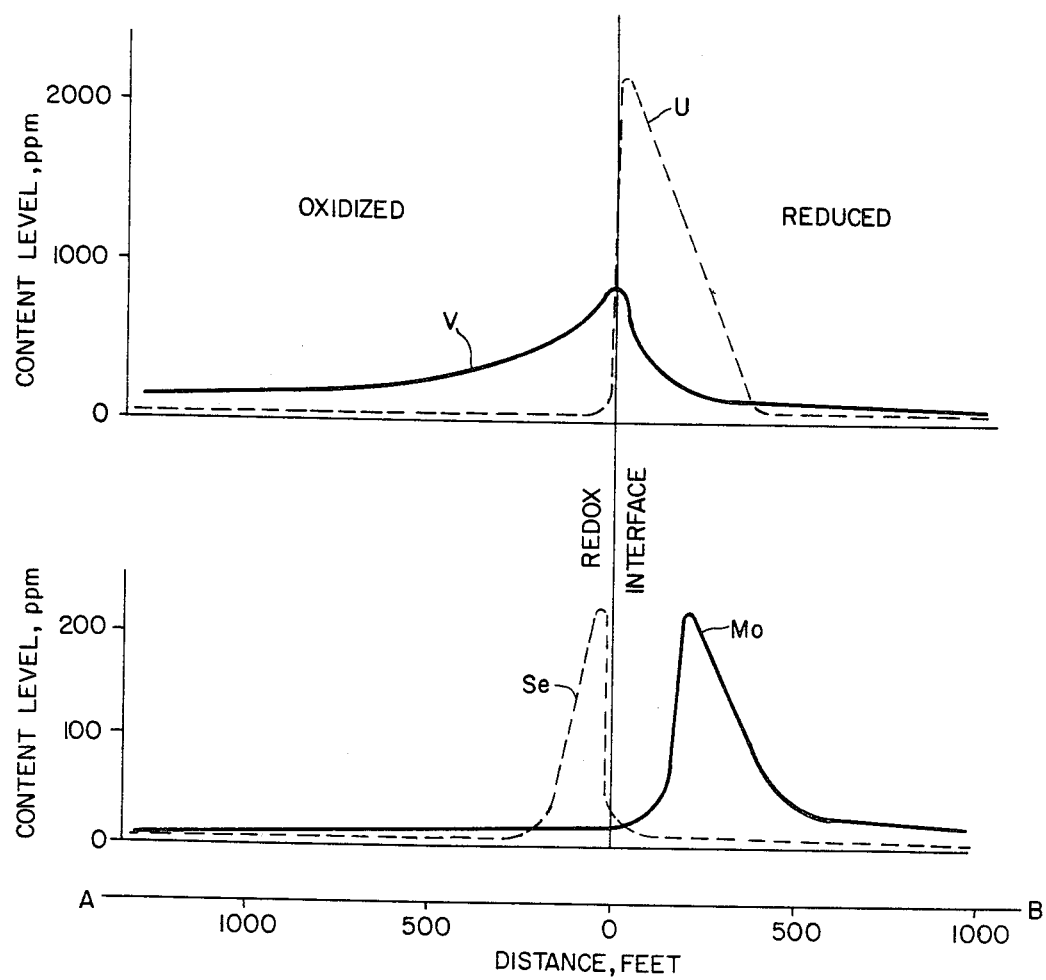
FIG. 2 comprises two vertically separated graphs plotting the distribution concentrations of several elements in a roll-front deposit at both sides of the redox interface.

Referring to FIG. 1 of the drawings, there is illustrated an exemplary cross-section through an ore roll front deposit showing a bullet-shaped redox interface, having a vertical tangential redox interface at the head of the oxidized zone at the center of the Figure. In the area of the redox interface existing between an oxidizing zone through which the waters containing dissolved uranium and other minerals enter from the left and a reducing zone to the right where the waters contact the reducing materials in the sand or sandstone, the uranium precipitates predominantly in the reducing zone over a period of time to produce a relatively concentrated ore zone in the sand or sandstone interstices. Other minerals in the water stream also precipitate either just before or after the uranium deposits. The mineral depleted waters then traverse to the right along the hydrological gradient through the reduced zone and thereafter disappear from the area. In the oxidized zone at the left in FIG. 1, the sandstone is brown or red colored indicating the presence of precipitated ferric oxide ($Fe_2O_3$ or $FeO(OH)$). A relatively sharp interface exists between the oxidized zone and the reducing zone which is evidenced by the abrupt change in color in the reduced zone to a light gray or drab color characteristic of the reduced minerals. The usual thickness of the sandstone containing these minerals is of the order of 10 to 50 feet in a vertical direction. The lateral extent of an ore deposit may be hundreds or even thousands of feet. The horizontal distances with respect to the vertical tangential redox interface are typically indicated in FIG. 1. This mineral containing sandstone is usually confined between upper and lower mudstones or relatively impervious shales. It is useful to know the general order and extent of deposition of some of the more important elements with respect to the redox interface and these are shown in FIG. 2 for a typical roll front deposit found in Texas. It will be noted that the uranium precipitates almost precisely beginning at the redox interface, with little being present in the oxidized zone, while in the reduced zone the uranium concentration drops steadily so that the uranium deposition is practically all concentrated within roughly the first 500 feet of entry into the reduced zone from the redox interface. In a Texas deposit in the Catahoula formation, the maximum concentration of the uranium is about 2000 ppm at the redox interface and the concentrations drops in a nearly straight line to a 10-20 ppm value at the 400-450 foot point away from the redox interface.

As is further evident in FIG. 2, the vanadium is more broadly distributed for a considerable distance in the oxidized zone ahead of the redox interface, reaching concentrations of about 800 ppm at the redox interface and then dropping slowly to a lesser concentration extending for some distance forward into the reduced area. Selenium is practically all precipitated in the oxidized zone in some 200 feet just immediately before the redox interface. Molybdenum, on the other hand, does not appear to be precipitated until the water stream bearing it had passed several hundred feet from the redox interface into areas of strongly reducing conditions. It is also significant that most of the molybdenum is present as molybdenum disulfide. Both selenium and molybdenum reach peak concentrations of about 200 ppm. Ferrous iron is present in greatly varying proportions throughout the area of the reduced zone where the sandstones are generally alkaline in nature having a buffered pH value of about 8.

Due to the presence of substantial amounts of calcite and other alkaline earth carbonates in roll fronts, the use of acidic leaching solutions often is not economically feasible. In many such sandstones the acids will react with the various alkaline earth metal carbonates such as magnesium and calcium carbonates, before they can start dissolving uranium. Consequently, much acid will be lost in ore deposits having substantial amounts of dolomite and limestone.

In accordance with the present invention, it has been discovered that ore deposits having characteristics such as those illustrated in FIGS. 1 and 2 of the drawings, may be rapidly and economically leached to recover a high proportion of the uranium in a relatively pure condition and only meagerly contaminated with other elements. In particular, it has been discovered that relatively dilute leach solutions containing from about 0.3 to 5 grams per liter, an optimum being from 0.5 to 2 grams per liter, of ammonium bicarbonate ($NH_4HCO_3$), from about 0.1 to 3 grams per liter of $H_2O_2$, an optimum being 0.3 to 1.5 grams per liter, or oxygen gas or even air, to provide an oxidizing agent, and a catalyst comprising ferric ammonium EDTA ($FeNH_4EDTA$) wherein the EDTA:Fe ratio is at least about 1.25:1, in an amount providing from about 3 to 100 ppm of iron, an optimum being from about 10 to 20 ppm, the pH of the leach solution being from about 7.4 to 9.5, when applied to the ore will rapidly and efficiently convert the tetravalent uranium it contacts to the hexavalent state which readily dissolves in the leach solution. A small amount of the order of one or two percent of the weight of the ferric ammonium EDTA, of ammonium EDTA (($NH_4$)$_4$EDTA) is desirably present in the leach solution in order to stabilize the iron chelate catalyst in the solution.

There is a preferential leaching of the uranium by the leach solution with respect to the contaminating metals and elements in the ore deposit, so that much smaller proportions of the molybdenum, vanadium, copper, selenium, arsenic are present in the leach solution as compared to their proportions in the ore. Therefore, there is beneficiation as well as good recovery of the uranium from the ore deposit.

The uranium enriched leach solution is withdrawn from the ore deposit. The amount of dissolved uranium may be from 100 to 1000 ppm in the solution, depending on the richness of the ore, the length of time of contact of the leach solution with the ore and porosity of the deposit, as well as other factors.

A convenient method for carrying out the leaching of the ore is to dispose a patterned array of injection wells about a roll front ore deposit, the well walls having perforated sections at the ore zone between the upper and lower mudstone strata shown in FIG. 1, so that leach solution can be forced from the well into the ore zone. Spaced a suitable distance from the injection wells have several withdrawal wells also having perforated sections in their walls in the ore zone so that leach solutions enriched in uranium by reason of their passage through the ore can enter and be pumped out to a surface treatment plant for extracting and recovering the uranium therefrom. A hydraulic gradient is maintained between the injection and withdrawal wells so the leach solution will flow from the former to the latter.

Figure 3:
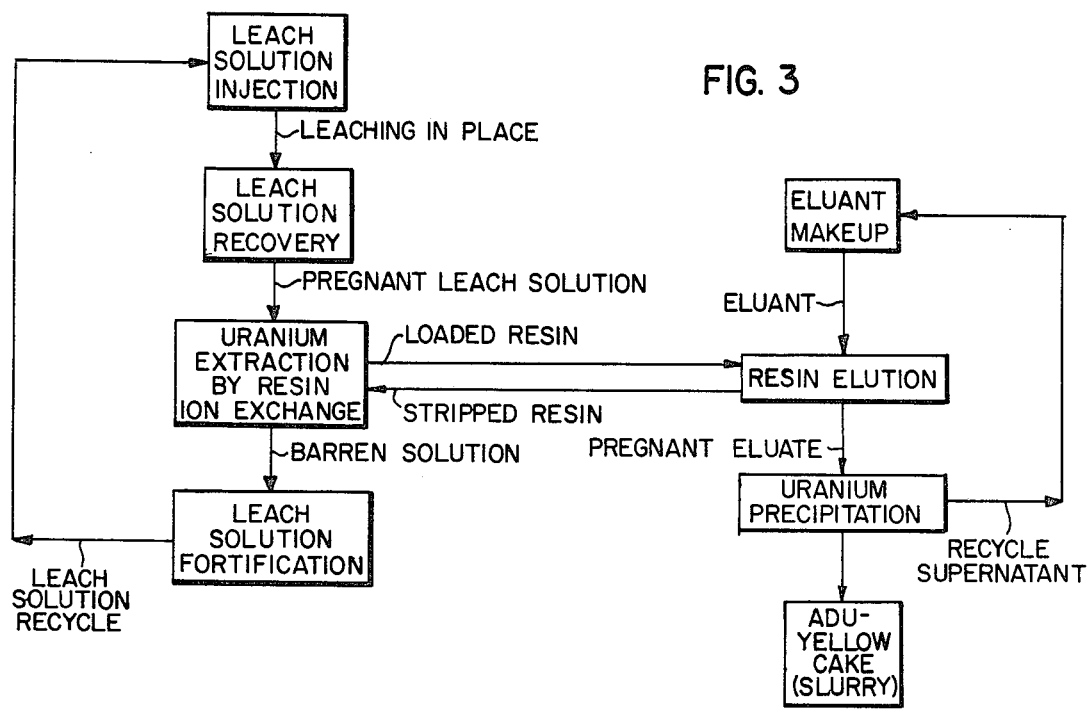
FIG. 3 is a flow sheet diagram of an in situ leaching operation.

Referring to FIG. 3 of the drawing, there is shown a flow sheet illustrating the overall general practice of the present invention. The leach injection solution comprises from 0.5 to 5 grams per liter of ammonium bicarbonate and from about 0.1 to 3 grams per liter of hydrogen peroxide, ordinarily added as aqueous hydrogen peroxide, and from 3 to 100 ppm of iron added as $FeNH_4EDTA$ wherein the EDTA:Fe ratio is at least 1.25:1, and sufficient ammonia is added to bring the pH of the solution to from about 7.4 to 9.5. The hydrogen peroxide is preferably added to the leaching solution immediately before it is delivered into the injection well leading to the underground ore deposit in order that the hydrogen peroxide does not decompose prematurely. The hydrogen peroxide could even be added to the leach solution in the well casing, making sure that it is mixed in before the leach solution enters the ore body. The leach solution in the injection well is usually under a pressure of from 50 to 250 psi. The pressure depends in part on the permeabiity of the sandstone and in part on the distance of the injection well from one or more withdrawal wells. It should be understood that injection of leach solution may be carried out in one or more injection wells either simultaneously or serially.

It has been found that good results are obtained when the injection wells are preferably disposed about one or more centrally located withdrawal wells which may be spaced to provide a distance of from about 20 to 100 feet between an injection well to the nearest withdrawal well. In some cases the injection well may be located advantageously on the upper side of the natural hydraulic gradient with respect to the withdrawal wells. Carefully located perforations are provided in the well casing to permit leach solution to flow directly only into the ore zone. The leaching solution is passing through the ore body will oxidize the ferrous iron to ferric iron and the tetravalent uranium present is converted to the hexavalent state. The ammonium bicarbonate in the leach solution reacts with and readily dissolves the hexavalent uranium in the form of uranyl dicarbonate complex. Very little iron from the ore dissolves in the leach solution. As the leaching solution contacts the uranium in the sandstone and oxidizes and then dissolves the resulting hexavalent uranium, it exposes any previously shielded or underlying tetravalent uranium which in turn is oxidized and then dissolved. After passing through the sandstone or other formation the enriched leach solution passes through perforations into the recovery or withdrawal well or wells. Usually a pump will be placed in the bottom of the recovery well and the water head in the recovery well is maintained at a low level in the well so that there is a low hydraulic pressure in the formation adjacent the withdrawal well. Consequently, a hydraulic gradient extends from the injection well to the withdrawal well thereby causing the leach solution to flow or percolate through the sandstone formation toward the withdrawal well. If desired, the withdrawal well may be capped and a pump at the bottom energized to draw a vacuum with respect to the surrounding ore deposit so that leach solution is drawn more strongly to the withdrawal well.

Tests have indicated that the dilute ammonium bicarbonate solution dissolves hexavalent uranium in substantial preference to the other mineral values which are also soluble to some extent in this leach solution. Thus, assuming an arbitrary ratio of the uranium to the other elements in the ore deposit is 1000 to 100, in the enriched leach solution the ratio of the uranium to the other elements may be of the order of 1000 to 5 to 10. Thus, a roughly 10 to 20 fold improvement in the proportion of the recovered uranium with respect to the other elements is obtained by use of the dilute alkaline ammonium bicarbonate leach solution.

Thus, in one case, where the ore body had 1269 ppm U (calculated as $U_3O_8$), vanadium 106 ppm, arsenic 12 ppm, molybdenum 8 ppm and selenium 3 ppm, the ratio of uranium to vanadium was 12, the ratio of uranium to arsenic was 106, the ratio of uranium to selenium was 403 and uranium to molybdenum was 159. After passing an aqueous leaching solution containing 0.95 gr. per liter of ammonium bicarbonate and 2.2 grams per liter of hydrogen peroxide, the solution exhibited a uranium to molybdenum ratio of 6800, a uranium to arsenic ratio of 5667, a uranium to selenium ratio of 531 and a uranium to molybdenum ratio of 59. A later test of the leach solution from this well showed that it now had a uranium to molybdenum ratio of 259, while the uranium to selenium ratio was 15,436. Apart from the iron chelate very little extraneous iron is found in the leach solution. Consequently, the selectivity of the dilute ammonium bicarbonate leach solutions of this invention for uranium as compared to other elements is excellent.

As shown schematically in FIG. 3, the enriched leach solution pumped from the withdrawal well is then passed to an ion exchange column comprising a strong base anion material such as a granular resin ion exchange material. In the ion exchange column, the uranium is preferentially extracted from the enriched leach solution with only a small proportion of the other elements being extracted. The ion exchange material is caused to progress countercurrently to the flow of leach solution so that the solution coming directly from the withdrawal well contacts ion exchange material which has picked up uranium from an earlier flow of leach solution therethrough, and as the leach solution traverses the column of the ion exchange material it meets ion exchange material which has absorbed less and less uranium and accordingly it will extract more and more of the uranium therefrom, until nearly depleted leach solution contacts relatively fresh ion exchange material thereby effecting the maximum uranium recovery.

The basic anion exchange material, for example, a 16 to 20 mesh ion exchange resin such as tertiary amine reacted chloromethyl-styrene-divinyl benzene resin (as described in Chemical Engineering for Mar. 18, 1963 on pages 166 and 167), when it has taken up nearly its maximum amount of uranium is removed in increments from the bottom of the ion exchange column and treated with an eluting solution. An aqueous eluant is applied countercurrently to the so-removed uranium charged basic anion exchange material to strip therefrom the uranium as ammonium uranyl dicarbonate and the stripped and rejuvenated ion exchange resin is then returned to the top of the ion exchange column to recover additional uranium. The concentration of uranium in the eluate produced by treatment of the basic anion exchange material may be from 5 to 18 grams per liter of uranium, computed as $U_3O_8$. A number of different continuous counter-current ion exchange contactors and eluant recovery systems may be employed. Examples of suitable systems are taught in the January 1969 issue of "British Chemical Engineering," pages 41 to 46 in an article by M. J. Slater entitled "A Review of Continuous Counter-Current Contactors for Liquids and Particulate Solids."

The uraniferous aqueous eluate is acidified and then ammonia is added to bring it to a pH of about 7 to 8 to precipitate ammonium diuranate (ADU) of a high purity. Ordinarily, the purity of the ADU precipitate after washing is such that the impurities therein will not exceed about 1%.

The barren leach solution ordinarily contains dissolved calcium salts. It is desirable to remove these calcium ions prior to refortification of the leach solution. To accomplish this, the barren leach solution is passed through an ion exchange where ammonium is substituted for calcium. The treated barren leach solution is then adjusted or fortified with additional ammonium bicarbonate, ammonia and hydrogen peroxide and reinjected into the ore deposit to extract additional uranium therefrom.

The ammonium bicarbonate for the leach solution may be prepared by adding ammonium bicarbonate to the aqueous leaching solution. However, a convenient and, probably the least expensive way of producing the leach solution, is by simply passing ammonia and carbon dioxide gases in the required proportions directly into the water where they react in situ into ammonium bicarbonate. At the same time, a slight excess of ammonia is added to bring the pH to the desired value of about 7.4 to 9. Particularly good results are had when the pH of the leach solution is about 7.7 to 8.5. The following Table of equations comprises the basic reactions of the process.

| TABLE PROCESS CHEMISTRY | | |
| --- | --- | --- |
| Leaching | $UO_2$ (mineral) + $H_2O_2$ <br> ↓ <br> $UO_3$ (oxidized mineral) + $H_2O$ <br> + <br> $NH_4HCO_3$ excess <br> ↓ <br> $(NH_4)_2UO_2(CO_3)_2$ + $NH_4HCO_3$ excess + $H_2O$ | Pregnant leach solution |
| Uranium Extraction by Resin Ion | $(NH_4)_2UO_2(CO_3)_2$ + $NH_4HCO_3$ excess <br> + | Pregnant leach solution |

TABLE PROCESS CHEMISTRY -continued

| Stage | Chemistry | Description |
|---|---|---|
| Exchange | RCl (resin chloride) ↓ | |
| | $R_2UO_2(CO_3)_2 \cdot R_2CO_3 \cdot RHCO_3 \cdot RCl$ ↓ | Loaded Resin |
| Resin Elution | $NH_4Cl + NH_4HCO_3$ excess $R_2UO_2(CO_3)_2 \cdot R_2CO_3 \cdot RHCO_3 \cdot RCl$ + $NH_4Cl + NH_4HCO_3$ ↓ | Barren leach solution for recycle Loaded Resin Eluant |
| | RCl ↓ | Stripped resin |
| Acidification | $(NH_4)_2UO_2(CO_3)_2 + NH_4Cl + NH_4HCO_3$ $(NH_4)_2UO_2(CO_3)_2 + NH_4Cl + NH_4HCO_3$ + $H_2SO_4$ ↓ | Pregnant eluate Pregnant eluate |
| | $UO_2SO_4 + CO_2 \uparrow + H_2O + NH_4Cl +$ $(NH_4)_2SO_4 + H_2SO_4$ slight excess $UO_2SO_4 + NH_4Cl + (NH_4)_2SO_4 + H_2SO_4$ slight excess + | Acidified eluate pH 2.5 Acidified eluate |
| Precipitation | $NH_3$ ↓ $(NH_4)_2U_2O_7$ (solid) (ADU) + $(NH_4)_2SO_4 = NH_4Cl$ | Uranium (ADU) precipitate slurry |

The enriched leach solution recovered from the ore deposit may contain small amounts of fine suspended calcite and clay particles. It is desirable to treat the barren leach solution to remove calcium by filtering the leach solution prior to reinjecting it into the well.

It has been found that occasional plugging of the ore deposit may occur in areas adjacent the injection well. Consequently, from time to time when the flow of the leach solution has diminished appreciably due to such plugging, each injection well may be treated by passing therethrough an acid, for example from 10 to 100 gallons of acetic acid. The acid dissolves any calcite or other reactive plugging materials so that free flow of the leaching solution can again take place.

LEACH SOLUTION COMPONENTS AND PREPARATION

In order to convert the tetravalent uranium to the hexavalent state a source of oxygen must be present in the leach solution. The preferred source of oxygen is peroxide of hydrogen ($H_2O_2$). In some cases oxygen gas can be injected along with the aqueous leach solution into the ore deposit. While pure oxygen gas is preferable, air can be employed. The time of reaction and rate of oxidation of the uranium will be lower with the gaseous oxygen than with the $H_2O_2$.

While hydrogen peroxide is available in concentrated solutions of up to 100%, such high strength solutions are hazardous to handle, in addition to being quite costly. Commercially available concentrations of aqueous hydrogen peroxide found to be useful in the practice of the present invention are those of at least 20% $H_2O_2$ concentration and preferably from about 30% to 40% hydrogen peroxide.

Ammonium bicarbonate ($NH_4HCO_3$) is commercially available as such and has been used in the practice of this invention with good results. However, outstanding leaching has been secured when the leach solutions were prepared from commercial "ammonium carbonate" which actually comprises nearly equal parts of ammonium bicarbonate and ammonium carbamate. Data will be presented showing these results.

The ferric ammonium EDTA may be purchased as a solid material, but the most convenient form is an aqueous solution having a 50% solids content by weight, wherein about a 2% excess of $(NH_4)_4EDTA$ is present as a stabilizer. The iron content of the 50% chelate is nearly 7% by weight—70,000 ppm. To prepare for a leaching program extending for 21 days during which 25 gallons of leachant will be injected per minute into an ore bed, there will be needed 108 gallons of the 50% ferric ammonium EDTA solution to provide 10 ppm of iron in the chelate catalyst therein.

Trivalent iron forms a complex with ethylene-diamine tetraacetic acid, of the formula $Fe(EDTA)^{-1}$. The ammonium salt of this complex is very stable and does not precipitate in alkali up to a pH of 12.

The anionic base exchange material will pick up some of the iron chelate catalyst. Thus, Ionac A-590 resin becomes saturated with about 0.3 pounds of the iron catalyst per cubic foot of resin. This same resin will saturate with uranyl carbonate complex at a loading of about 2.3 pounds per cubic foot. The ferric ammonium EDTA will build up in the eluant solution and from time to time a portion may have to be discarded and replaced with fresh solution.

The vast majority of the ferric ammonium EDTA in the leach solution will remain in the ore bed. In some cases, it may be practical to cease adding the iron chelate catalyst to the leach solution after a period of several days circulation of the full leach solution into the ore bed, and simply to recirculate leach solution to which only ammonium bicarbonate and $H_2O_2$ have been added to the stripped leach solution.

Tests have clearly established that the function of the ferric ammonium EDTA chelate having an EDTA:Fe ratio of at least 1.25:1, is catalytic in nature, and its presence in the leach solution greatly improves the rate at which the tetravalent uranium is oxidized to the hexavalent state and thus dissolves at a greater rate in the alkaline leach solution. The ferric component of this chelate is critical. These facts are evidenced from tests whose data are plotted as the several curves in FIG. 4. The tests were conducted by agitating 1.00 gram of the powdered $UO_2$ in 100 milliliters of a 0.15 molar ammonium bicarbonate solution (about 6 grams per liter of $NH_4HCO_3$ introduced as ammonium bicarbonate-ammonium carbamate mixture), and oxygen gas was bubbled therethrough and the results are shown in curve 1. The addition of $(NH_4)_4EDTA$ only to the leach solution of curve 1 resulted in a lower rate of dissolution of the uranium as is evident in curve 2. Curves 3 and 4 show a great increase in the rate of dissolution of the uranium when two different amounts of ferric ammonium EDTA were added to the leach solution of curve 1. The introduction of 200 milligrams of Fe as ferric ammonium EDTA results in a slight lowering of the dissolution rate of the $UO_2$ as compared to the solution with 100 milligrams of Fe in the catalyst; however, this difference may be due to experimental error and test variables.

The criticality of the EDTA:Fe was established in a series of tests made employing otherwise identical leach solutions except that the ferric ammonium EDTA used had different EDTA:Fe ratios. The curves of FIG. 5 were plotted from tests wherein the solutions were similar to those used for carrying out that of curve 3 of FIG. 4, and the tests were also similarly conducted. As shown by the curves of FIG. 5 ferric ammonium EDTA with EDTA:Fe ratio of 1:1 has no appreciable catalytic effect. Iron chelates with an EDTA:Fe ratio of 1.5:1 show an enhanced solubilization of $UO_2$, while further enhanced catalysis occurs when the EDTA:Fe ratio goes to 2:1 and 3:1. No increased benefit occurs when the EDTA:Fe ratio exceeds 2:1. Other tests were made with the ferric chelate catalysts at ratios between 1:1 and 1.5:1, and it was found that beneficial catalytic results were obtained when the EDTA:Fe ratio was about 1.25 and higher.

From a number of tests it was found that for each ton of uranium ore containing about 0.1% of uranium (2 pounds of uranium per ton or ore), sufficient ferric ammonium EDTA should be present in the applied leach solution to provide 0.2 pound of iron. In general, from 0.05 to 0.5 pound of the ferric ammonium EDTA should be supplied for each ton of uraniferous ore containing from about 0.2% to 0.02% of $U_3O_8$ by weight. In practice, a slightly greater amount of the chelate may be necessary to replace losses from spillage, escape into rock fissures and aquifers.

Figure 4:
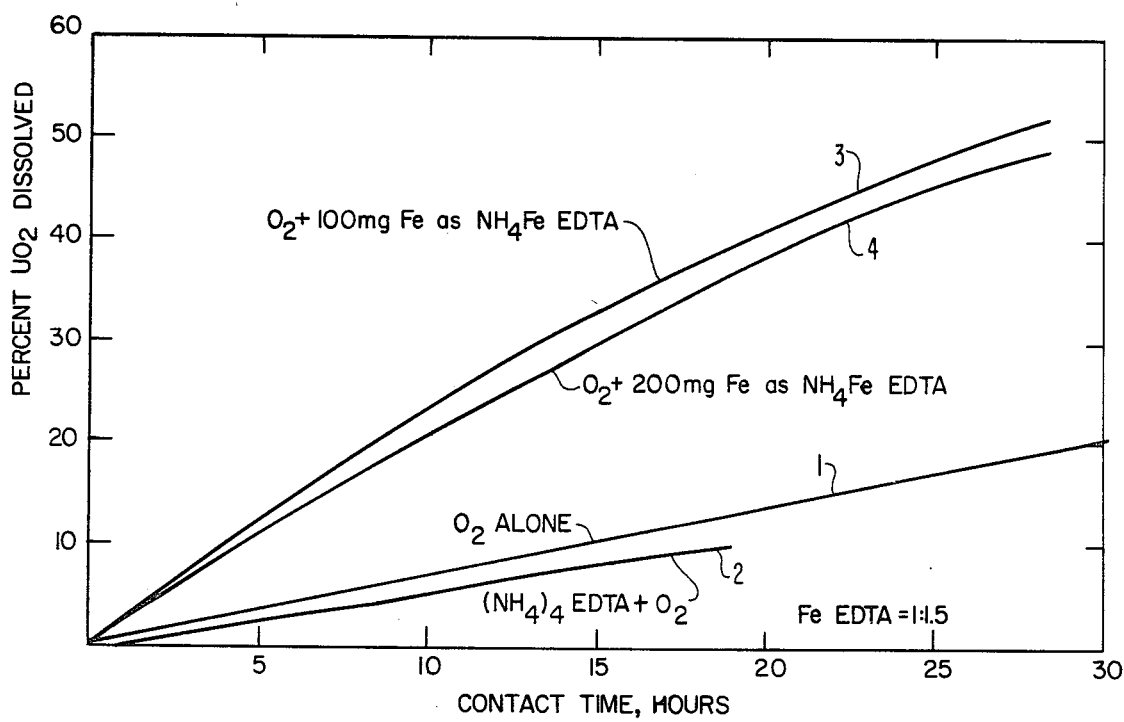
FIG. 4 is a graph plotting percentage of uranium dissolved against contact time for four different leach solutions.
Figure 5:
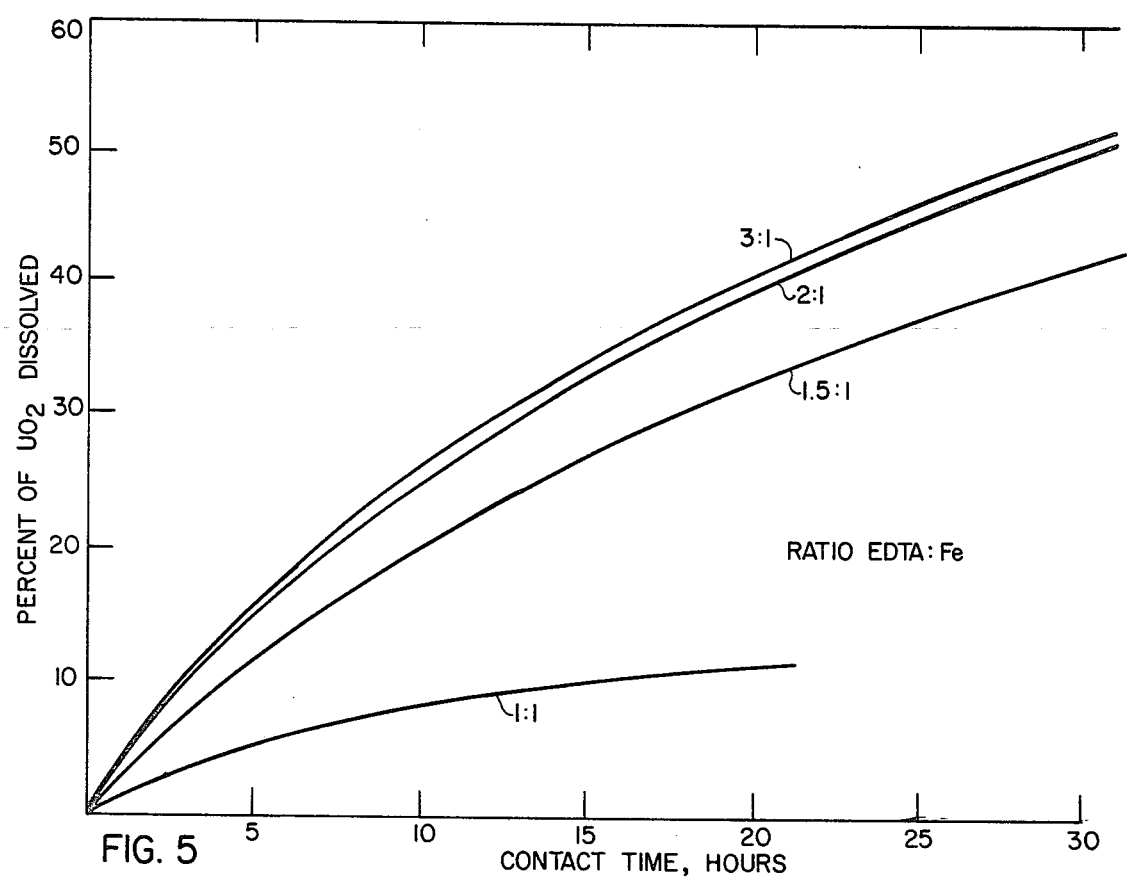
FIG. 5 is a graph plotting percent of uranium dissolved for four alkaline leach solutions wherein the chelate catalyst comprised four different ratios of EDTA:Fe.

The agitation leaching tests used in obtaining the data of FIGS. 4 and 5 constitute highly accelerated conditions as compared to the far slower flows of the leach solutions which would occur in underground percolation leaching of ore. Therefore column leach tests were conducted to simulate a little more closely actual field conditions. Six columns were each packed with 90 grams (dry basis) of uranium ore from the Irrigaray field in Wyoming. The ore samples were analyzed and average 0.086% uranium, 1.5% iron, 0.022% vanadium, 0.023% copper and 0.0012% molybdenum. Six different leach solutions were prepared for circulation through the columns as follows:

A. 10 ppm Fe (in $NH_4FeEDTA_{1.5}$), 50% excess (based on the $NH_4FeEDTA_{1.5}$) of $(NH_4)_4EDTA$, 0.5 g/l $H_2O_2$, 1 g/l $NH_4HCO_3$-pH 7.97

B. 10 ppm Fe (in $NH_4FeEDTA$), 50% excess $(NH_4)_4EDTA$, $O_2$ gas, 1 g/l $NH_4HCO_3$-pH 7.97

C. 0.5 g/l $H_2O_2$, 1 g/l $NH_4HCO_3$-pH 7.97

D. 10 ppm Fe (in $NH_4FeEDTA_{1.5}$), 0.5 g/l $H_2O_2$, 1 g/l $NH_4HCO_3$-pH 7.97

E. 10 ppm Fe (in $NH_4FeEDTA_{1.5}$), 0.5 g/l $H_2O_2$, 1 g/l $NH_4HCO_3$ and ammonium carbamate-pH 8.94

F. 0.5 g/l $H_2O_2$, 1 g/l $NH_4HCO_3$ and ammonium carbamate-pH 8.93

In the solutions of E and F, the ammonium carbonate and the ammonium carbamate were in nearly equal proportions. These leach solutions were passed through the columns for 70 hours, and the solutions were analyzed from time to time to determine the percentage of uranium extracted from the ore by each solution.

As might be expected, the lowest extraction rate was by solution B which used oxygen instead of $H_2O_2$. The next lowest rate was by solution C which had no chelate catalyst. Both solutions A and B showed a blue coloration due to the copper extracted from the ore which is due to the presence of the excess $(NH_4)_4EDTA$. Solution D gave the best overall rate of the solutions A to D.

The most dramatic extraction rates were exhibited by leach solution E which incorporated the iron chelate catalyst and the ammonium bicarbonate and ammonium carbamate mixture, along with the peroxide. Equally important with the greatly increased rate of dissolution of the uranium is the fact that over 90% of the uranium was extracted by solution E in less than 50 hours, while solution F extracted nearly 75% of the uranium in the same period.

Figure 6:
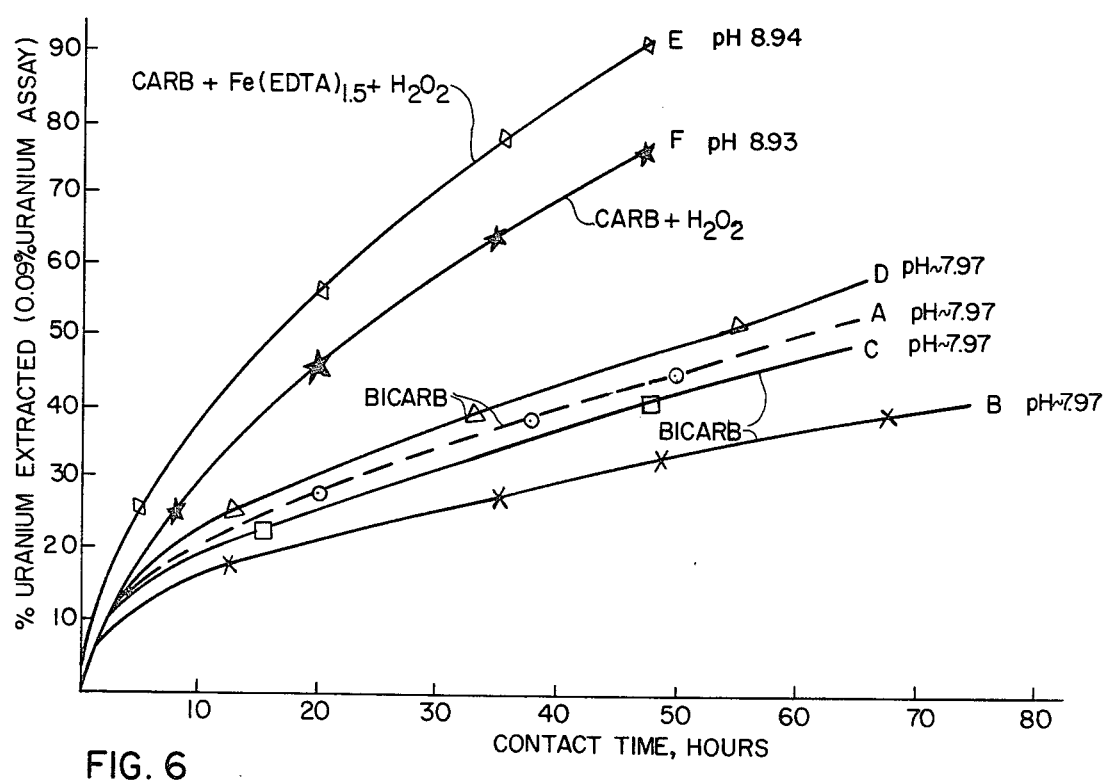
FIG. 6 is a graph plotting percent uranium extracted from a column of ore by six different leach solutions.

Solutions D and E contained about 2% of $(NH_4)_4EDTA$ based on the weight of the iron chelate, but no blue color was evident after the ore was contacted for the entire test time. Consequently it was clear that no copper was extracted, at least not to any significant extent. The results of these tests are plotted in FIG. 6.

Figure 7:
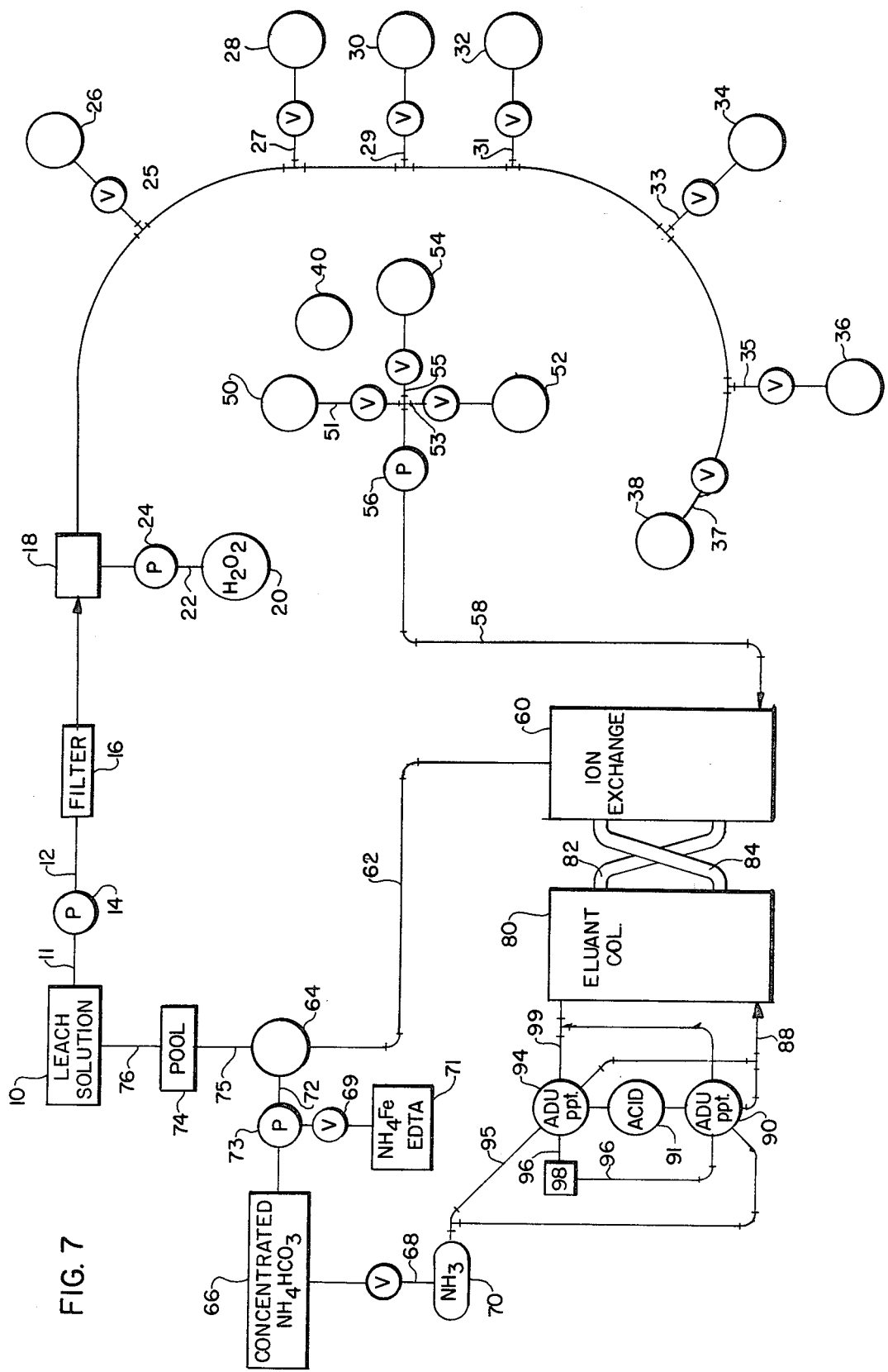
FIG. 7 is a schematic top plan view of a field arrangement of apparatus including wells and equipment for preparing the leach solutions and for recovering the uranium from enriched leach solutions, and recycling means.

Referring to FIG. 7, there is schematically illustrated an arrangement of apparatus and associated wells for extracting uranium from an underground ore deposit in practicing the invention. In a tank 10 there is a supply of leach solution which comprises from 0.3 to 5 grams per liter of ammonium bicarbonate, and preferably a mixture of ammonium bicarbonate and ammonium carbamate, and ferric ammonium EDTA wherein the EDTA:Fe ratio is at least about 1.25:1, in an amount to provide from about 3 to 100 ppm of iron, at a pH of from 7.4 to 9.5. From tank 10 the leach solution flows through pipe 11 to a pump 14 which pumps the solution at a pressure of from about 50 to 250 psi into a line 12 leading in due course to one or more injection wells. The leach solution under pressure is first conveyed by line 12 to a filter 16 where any fine clay, calcite and other solid particles are filtered out, and thence to a hydrogen peroxide injector 18. Aqueous hydrogen peroxide, for example, 30% $H_2O_2$, in a storage tank 20 passes by pipe 22 to a pump 24 which pressurizes it into the injector unit 18 where measured proportions of the hydrogen peroxide are injected into the leach solution at a rate to provide from about 0.1 to 3 grams of $H_2O_2$ per liter of each solution. The pipe 12 is connected to each of injection wells 26, 30, 32, 34, 36, and 38 by branch conduits 25, 27, 29, 31, 33, 35, and 37, respectively, each of the latter having valves therein to enable control of flow of the pressurized leach solution into one or more wells at any selected time or sequence.

As is known in the art, the wells comprise a casing which penetrates into or through at least one uranium bearing ore stratum. Perforations and/or screens are present in the portions of the well casing disposed in the uranium bearing stratum to permit pressurized leach solutions to penetrate into and through the uranium bearing ore. Normally efforts are made to minimize passage of the leach solution to any other stratum by employing suitable sealing means between the casing and the well bore. The uranium bearing ore stratum, such as the roll front deposits described above comprise sandstone, sand or other permeable formations through which the leach solution passes readily. The ore bearing formation is usually characterized by the presence of an underlying less fluid pervious shale or clay layer, and an impervious cap layer of shale, mudstone, or clay so that the leach solution flows laterally from the well casing perforations into the uranium ore body with very little vertical flow into formations containing little or no uranium. The leach solution spreads laterally from the injection wells, following the hydraulic gradient, and any channels or fissures in the ore body. The hydrogen peroxide in the leach solution assisted by the iron chelate catalyst, upon contacting any tetravalent uranium converts it into hexavalent uranium which last is readily dissolved by the ammonium bicarbonate leach solution. If the uranium is present as large particles or as a modular mass or body of appreciable size, the uranium is progressively converted, from the exterior surface inwardly, to the hexavalent state and each converted surface layer is dissolved as successive quantities of leach solution pass and come into contact with it. It appears that while much of the iron is converted to the ferric state, very little is dissolved in the leach solution, so that nearly all the iron remains underground. Similarly, only small amounts of molybdenum, vanadium, copper, arsenic and selenium are dissolved in the relatively dilute leach solution. By comparison, a high proportion of the uranium in the ore deposit contacted by the leach solution is dissolved with the passage of sufficient leach solution through the ore body.

A monitor well 40 is also drilled in order to enable pH, hydrostatic pressure, temperature, solution density and other factors to be determined by disposing suitable instruments therein.

In order to withdraw the pregnant leach solution rich in uranium, one or more withdrawal wells are disposed in a spaced configuration with respect to the adjacent injection wells. A suitable configuration used with success is to dispose an encircling array of injection wells about a smaller number of withdrawal wells. For example, in one case, seven injection wells were spaced to surround three withdrawal wells.

If there is a strong hydraulic gradient and elongated fissures or the like in one direction, the withdrawal wells may be placed so that they are at the lower end of the hydraulic gradient in order that the leach solution will naturally flow in their direction and be intercepted.

Disposed within withdrawal wells 50, 52, and 54 are valved connecting conduits 51, 53, and 55 respectively, connected by a pump 56 to a pipe 58 for carrying pregnant solution to a uranium recovery system. While pump 56 is shown external of the wells, a separate submerged pump disposed in each well has been used in each well with good results. Ordinarily, an end of each conduit 51, 53, and 55 is disposed at the lower end of the well with which it is associated. The withdrawal well comprises a casing with a perforated portion with suitable screens to permit leach solution to flow into it without allowing sand and other solids to come through. The pump 56 can be operated to keep the leach solution at any selected level in the well so as to maintain a desired hydraulic head therein so that flow of each solution therein is established and controlled. Each well can be capped and a vacuum applied by operation of the pump 56 so that leach solution is attracted more strongly to the withdrawal well.

The uranium enriched leach solution is transported by pipe 58 to an extraction column 60 where it is introduced at the bottom of a bed of, for example, 12 to 20 mesh strong base anion exchange resin which moves countercurrent to the flow of the leach solution and strips the uranium from the leach solution, with however, little of the contaminating metals and elements in the leach solution being stripped.

The depleted or barren leach solution passes from the top of column 60 via a pipe 62 to a make-up tank 64. There a concentrated aqueous solution of ammonium bicarbonate, and preferably the mixture of ammonium bicarbonate-ammonium carbamate previously described, in tank 66 with sufficient $NH_3$ from a storage tank 70 admitted through valved line 68, is conveyed by pipe 72 by operation of a pump 73 to bring the barren leach solution in tank 64 to the desired proportions of from about 0.3 to 5 grams per liter, and the pH to a value of from 7.4 to 9.5 so that it can be recycled. Pump 73 is connected by a valved pipe 69 to a storage tank 71 containing $NH_4FeEDTA$ solution with about 2% of $(NH_4)_4EDTA$, so that by operation of the valves in pipe 69 the pump 73 can introduce the necessary amount of iron chelate solution into the solution in make-up tank 64 to bring it up to the desired catalyst content. The properly adjusted leach solution in tank 64 is conveyed by pipe 75 to a pool reservoir 74 and when needed the leach solution is then carried by pipe 76 to the tank 10 from where it is injected into the wells 26–36. It will be understood that two or more make-up tanks 64 may be alternately filled with barren leach solution while a full make-up tank is being adjusted to full strength leaching condition.

The uranium loaded base anion exchange resin in column 60 is preferably removed, either in increments or continuously, from the bottom of the column and transferred by a line 82 to an elution column 80 where it is treated with strong aqueous solution of ammonium chloride, for example 1.5 molar, with a small concentration of ammonium bicarbonate, about 0.1 molar, entering through pipe 86. The uranium is thus extracted by this solution from the ion exchange resin to provide a uranium rich eluate. The stripped and regenerated ion exchange resin is returned by line 84 to the top of column 60 where it again descends and progressively strips uranium from the leach solution passing upwardly.

The eluate with a high content of uranium, for instance, for 10 to 20 grams per liter, is carried by pipe 88 from column 80 to either one of two ammonium diuranate (ADU) precipitating tanks 90 and 94. When one of the tanks 90 or 94 is filled with the eluate, the eluate is then conveyed to the other tank. Into the eluate filled tank 90 or 94, a measured amount of acid from a supply tank 91 containing HCl, for example, is added to the eluate, with suitable agitation and stirring. Then ammonia is added from supply tank 70 via pipe 95 to cause the solution to reach a pH of about 7, whereupon ADU precipitates. Upon letting the ADU precipitate settle, the supernatant liquid is reconveyed by conduit 99 to the eluant tower 80, while the ADU slurry at the bottom is pumped to an ADU storage reservoir 98 through conduit 96. The final ADU product contains only small amounts of residual impurities.

By employing the leach solutions of the present invention, not only is there a more rapid recovery of the uranium in an ore deposit, but just as important, there will be a more complete recovery of all the uranium in the ore deposit, approaching 100% in many cases, all in relatively short periods of time.

Tests on a large ore deposit in Wyoming have begun and preliminary results indicate an enhanced recovery of uranium from the ore deposit using the iron chelate catalysts of this invention incorporated in the ammonium bicarbonate solutions.

While the leaching process described herein will give excellent results in uranium bearing roll front ore deposits, the solutions can be applied to other types of ore deposits where the ore body is reasonably permeable to the flow of the aqueous leach solutions. In many cases, dense or poorly permeable ore bodies can be loosened or fractured by applying controlled explosive charges to shatter or to open up the rock structure. The process can be applied to mined ore which can be treated by placing the ore in large vats or elongated reservoirs and the leach solutions caused to traverse the ore and thus dissolve out the uranium. Typical ores that can be so processed are coffinite, pitch-blended and uraninite wherein the tetravalent uranium is rendered soluble in the leaching solution by oxidation to the hexavalent state, and the uranium reacts with the bicarbonate component to form the stable uranyltricarbonate complex anion- $UO_2(CO_3)_3^{-4}$, which is quite soluble in the leach solution.

We claim as our invention:

1. In the process of leaching and recovering of uranium from ore in which the uranium is the present in the tetravalent state, the steps comprising:
    (a) applying to the ore an aqueous leach solution comprising essentially from about 0.3 to 5 grams per liter of ammonium bicarbonate, from about 0.1 to 3 grams per liter of $H_2O_2$ and ferric ammonium EDTA wherein the EDTA:Fe ratio is at least about 1.25:1, the ferric ammonium EDTA providing from 3 to 100 ppm of iron in the solution, the pH of the solution being about 7.4 to 9.5, the leach solution converting tetravalent uranium with which it comes in contact to the hexavalent state which then readily dissolves in the solution,
    (b) withdrawing from the ore leach solution enriched in uranium, and
    (c) stripping the uranium from the withdrawn uranium enriched solution.

2. The process of claim 1, wherein the leach solution comprises from about 10 to 20 ppm of iron present as ferric ammonium EDTA with the EDTA:Fe ratio being about 1.5:1 to 2:1.

3. The process of claim 1, wherein the ammonium bicarbonate is introduced into the leach solution as a mixture of ammonium bicarbonate and ammonium carbamate.

4. In the process of leaching uranium from an ore deposit in which the uranium is in the tetravalent state, the steps comprising:
    (a) passing through the ore deposit an aqueous leach solution comprising from about 0.3 to 5 grams per liter of ammonium bicarbonate, sufficient ferric ammonium EDTA to provide from about 3 to 100 ppm of iron, the EDTA:Fe ratio being at least about 1.25:1, and oxygen being present in the leach solution, the pH of the leach solution being between 7.4 and 9.5, the oxygen being equivalent to that provided by from 0.1 to 3 grams per liter of $H_2O_2$, the oxygenous leach solution converting tetravalent uranium it contacts into the hexavalent state which dissolves in the leach solution,
    (b) withdrawing from the ore deposit uranium enriched leach solution, and
    (c) stripping the uranium from the withdrawn enriched leach solution.

5. The process of claim 4, wherein the oxygen in the leach solution is provided by a gas containing free oxygen.

6. The process of claim 4, wherein the ammonium bicarbonate is introduced into the leach solution as a mixture of ammonium bicarbonate and ammonium carbamate.

7. The process of claim 4, wherein the ferric ammonium EDTA is applied in the amount of from about 0.05 to 0.5 pound per ton of uraniferous ore containing about 0.2 to 0.02% of $U_3O_8$ by weight.

8. In the process of in situ leaching and recovery of uranium from an ore deposit containing uranium associated with proportions of one or more undesirable metals and elements such as molybdenum, vanadium, selenium, arsenic and copper, the steps comprising:
    (a) passing through the ore deposit an aqueous leach solution comprising essentially from about 0.3 to 5 grams per liter of ammonium bicarbonate, sufficient ferric ammonium EDTA to provide from about 3 to 100 ppm of iron, with an EDTA:Fe ratio of at least 1.25:1, and from about 0.1 to 3 grams per liter of $H_2O_2$, the leach solution having a pH of between 7.4 and 9.5, the leach solution converting any tetravalent uranium it contacts to the hexavalent state which readily dissolves in the leach solution,
    (b) withdrawing from the ore deposit the uranium enriched leach solution,
    (c) contacting the withdrawn uranium enriched leach solution with a base anion exchange material to cause the uranium to be extracted from the leach solution and to be retained in the ion exchange material,
    (d) separating the ion exchange material loaded with extracted uranium from the stripped leach solution,
    (e) applying an aqueous alkaline eluant solution to separated uranium loaded ion exchange material to extract and dissolve the uranium therefrom, and to regenerate the ion exchange material for reuse to extract more uranium from leach solutions, and
    (f) acidifying the uranium containing eluate solution and then introducing ammonia to precipitate relatively pure ammonium diuranate therefrom, the several leaching, ion exchange extraction and eluant treatment steps each resulting in a lower proportion of said other metals and elements to the uranium being present than in the original ore deposit proportions.

9. The process of claim 8, wherein the stripped leach solution as separated in step (d), is adjusted by adding more ammonium bicarbonate, $H_2O_2$, and ferric ammonium EDTA and ammonia to bring the leach solution to full leach strength as in step (a), and is then recirculated through the ore deposit.

10. The process of claim 8, wherein the ammonium bicarbonate in the leach solution comprises a mixture of ammonium bicarbonate and ammonium carbamate.

11. The process of claim 8, wherein after the uranium has been leached out of the ore deposit, there is passed a reducing aqueous solution to cause any residues of uranium and the other metals and elements to be rendered insoluble in water and to precipitate.

12. The process of claim 8, wherein the aqueous leach solution comprises from about 10 to 20 ppm of iron present as ferric ammonium EDTA with the EDTA:Fe ratio being from about 1.5:1 to 2:1.

* * * * *